United States Patent [19]
Frater et al.

[11] Patent Number: 5,759,418
[45] Date of Patent: Jun. 2, 1998

[54] ADHESIVELY ATTACHED HARD DISK HEAD SUSPENSION AND ETCHING PROCESS

[75] Inventors: Norman Kermit Frater; Oscar Jaime Ruiz, both of San Jose, Calif.

[73] Assignee: International Business Machines Corporation, Armonk, N.Y.

[21] Appl. No.: 663,966

[22] Filed: Jun. 14, 1996

[51] Int. Cl.$^6$ .................................................. B44C 1/22
[52] U.S. Cl. ........................... 216/22; 216/34; 360/104
[58] Field of Search ........................ 216/22, 33, 34, 216/52; 29/603; 360/104–109, 110, 128, 130.2

[56] References Cited

U.S. PATENT DOCUMENTS

| | | | |
|---|---|---|---|
| 3,246,383 | 4/1966 | Peloschek et al. | 29/155.5 |
| 3,851,375 | 12/1974 | Koorneef | 29/471.9 |
| 3,972,111 | 8/1976 | Dash | 29/458 |
| 4,435,900 | 3/1984 | de Wilde | 29/603 |
| 5,162,073 | 11/1992 | Aronoff | 216/22 X |
| 5,173,824 | 12/1992 | Olson | 360/125 |
| 5,353,181 | 10/1994 | Frater et al. | 360/104 |
| 5,353,183 | 10/1994 | Olson | 360/125 |
| 5,645,735 | 7/1997 | Bennin et al. | 216/22 |

*Primary Examiner*—William Powell
*Attorney, Agent, or Firm*—Baker Maxham Jester & Meador

[57] ABSTRACT

A head gimbal assembly for disk drives is attached to an actuator arm using an adhesive. An etch pattern is formed in the mount plate of the head gimbal assembly, defining a mating surface area. An actuator arm is received by the mating surface area, the two members are suitably aligned, and an adhesive is introduced into the various channels that comprise the etch pattern through an access opening that is located outside of the mating surface area. By locating the access opening outside of the mating surface area, the adhesive may be introduced after a final alignment is achieved between the head gimbal assemblies and the actuator arms. Such manner of attachment may be used with individual actuator arms as well as when connecting head gimbal assemblies to an actuator comb assembly.

34 Claims, 6 Drawing Sheets

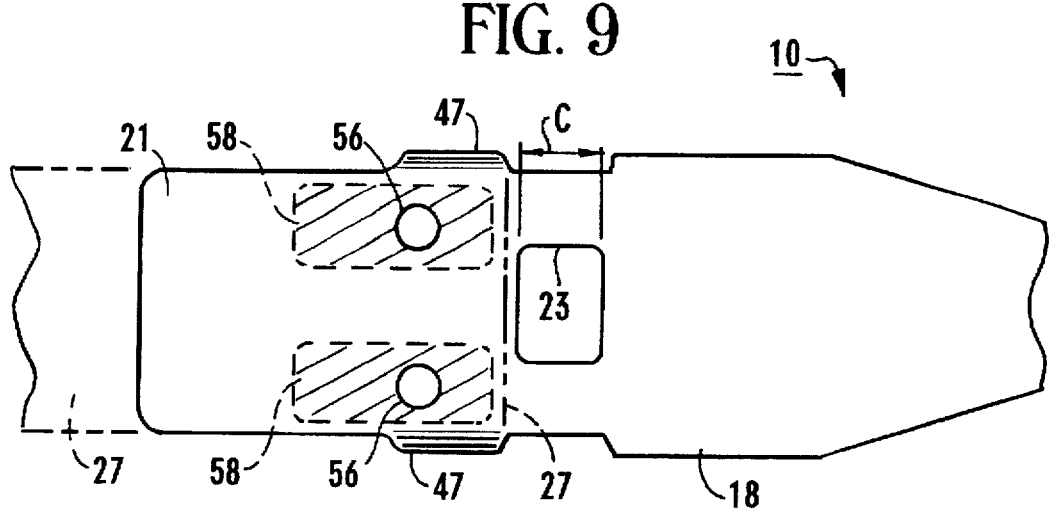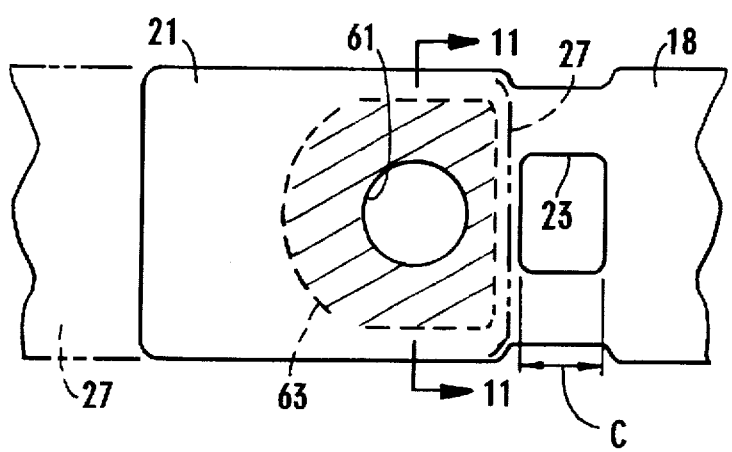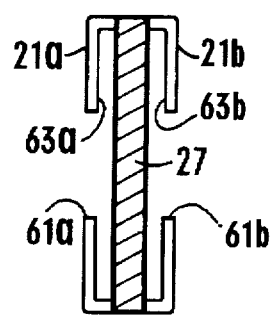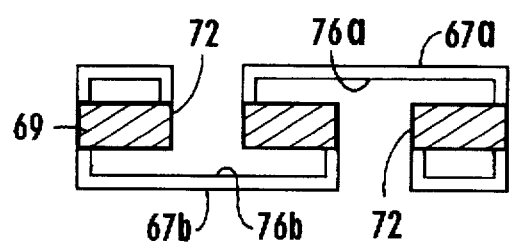

ADHESIVELY ATTACHED HARD DISK HEAD SUSPENSION AND ETCHING PROCESS

BACKGROUND OF THE INVENTION

1. Field of the Invention

The present invention relates to a head gimbal assembly (HGA) for a data storage system, and more particularly, to such an assembly wherein the head suspension is attached to an actuator arm using an adhesive that is distributed through a network of channels formed in that portion of the surface of the head gimbal assembly base that mates with the actuator arm.

2. Description of the Related Art

Direct access storage devices of the type known as "Winchester" disk drives, or "disk drives", are well known in the computer industry. Disk drives store information on concentric, recorded tracks written on one or more rotatable, magnetic disks. Magnetic heads or transducer elements are provided for each such disk, and move from track to track to either read previously stored information or to record information on the magnetic tracks ("read" - "write", respectively). An electromagnetic transducer typically is carried in a slider that is supported over the surface of a rotating disk by a self-acting, hydrodynamic air bearing.

The slider transducer combination is referred to collectively as a "head", and it is attached to a head gimbal assembly (HGA) that suspends and loads (or biases) the head toward a disk surface. The HGA is in turn connected to a rotary or linear actuator that controllably moves the head from track to track on the disk, in response to electrical signals generated by controlling circuitry.

The trend towards increasing density of memory storage devices has not bypassed disk drives. Continuing improvements in the magnetic recording media, the head designs, and the control circuitry have permitted the data tracks to become smaller and closer together. Providing a high storage capacity, rotary disk drives have been designed that employ a multitude of magnetic disks within a package height of 1" or 1.6" high.

A head is provided each such disk to read/write magnetic data, with individual heads and respective gimbal assemblies each attached to a separate actuator. The actuators collectively form a device termed an "actuator comb." With present space requirements restricting the rotary disk drive vertical package height to either the 1" or 1.6" form, any further increase in the storage capacity requires increasing the number of disks placed within this dimensionally-limited package. Increasing the number of disks requires a decrease in the distance between adjoining disks.

One of the limitations to achieving smaller disk spacings is the attachment hardware used to connect the HGA to the rotary actuator arm. Presently, ball swaging is the preferred method, and such form of attachment requires the utilization of two mount plates—one for each HGA. For very small disk-to-disk spacings, such as 1.4 to 1.6 mm, it is possible to make use of the extensions of swage technology, such as the HTI interlock swage, the Seagate tandem swage, and the IBM thin back-to-back swage. Ultra thin swage spuds are used in this IBM head/arm suspension assembly to achieve 1.82 mm disk-to-disk spacings. By utilizing 0.15 mm thick mount plates and 0.5 mm arm thicknesses, this technology can probably be extended down to approximately 1.65 mm disk-to-disk spacing. However, as the disk-to-disk spacings diminish further, there is insufficient room to stack together an arm of appropriate thickness, a swage connector, an appropriately-thick suspension member, and a pair of mounts, and still have sufficient clearance between the point of attachment and the disk for manufacturing tolerances and shock deflection.

Since the above-described swage attachment technology can only be extended to approximately 1.65 mm disk-to-disk spacings, alternate attachment technologies are required if such disk-to-disk spacing is to be reduced to between 1.1 mm and 1.65 mm.

Various alternative attachment methods have been attempted over the years, with varying degrees of success. One IBM head/arm assembly utilizes welding to attach single suspensions to arms in a one-disk file. Welding has proven successful in this application, both because the arm provides the same function as a commonly-used mount plate in conventional systems, and since only one suspension is attached to each arm, the suspension can be pre-welded to the arm prior to wiring a slider attachment.

As originally assembled, an IBM disk drive system used head gimbal assemblies that were bonded to aluminum arms, which were in turn combined with other such assemblies into an actuator stack. Using such construction techniques, 1.365 mm disk-to-disk spacing was made possible. However, this bonding method utilizes the manual application of the epoxy adhesive to the arm with a doctor blade. The suspension is positioned onto the locating pins, clamped, and the epoxy is heat-cured. Dissatisfaction with this assembly process caused these assemblies to later make use of a welding technique, wherein, the head gimbal assemblies are welded to both sides of steel snap arms, which in turn are individually inserted into a special steel actuator hub.

This welding was performed after the wiring and the sliders were assembled to each suspension. To accomplish this task requires the arm to be inverted during the welding process, risking weld contamination onto the bearing surface of the slider. In both cases, whether the original bonding technique or the subsequently used welding techniques were used, attachment proceeded on an individual arm basis, with the arms then stacked or inserted to complete the actuator. In either case, the bonding technique and the welding technique are not suited for use in the actuator comb assembly.

One possible solution to reducing the disk-to-disk space would provide for the elimination of the two mount plates. Since the thinnest mount plate in use now measures approximately 0.2 mm in thickness, the elimination of both plates enables a savings in thickness of 0.4 mm. Additionally, if the swage-type connection is not utilized, a reduction in the arm tip thickness of by 0.1 or 0.2 mm becomes possible. The combined savings in thickness values would permit the disk-to-disk spacing to be reduced to within the range of 1.2 mm to 1.4 mm. The use of an adhesive to directly bond the head suspension assembly to the actuator arm would permit the elimination of the mount plates and the reduction in the actuator arm tip thickness.

Previous attempts to utilize an adhesive to directly bond the head suspension to the actuator arm have not proven practical, even with large disk-to-disk spacings. The use of an adhesive material presents a number of separate manufacturing process problems. Since a sound mechanical connection is desired, it is important that the adhesive be distributed over the bonding surface in a thin, uniform layer. The HGA then must be brought into position adjacent to the actuator arm tip, and carefully positioned to achieve the critical alignment required of the read/write element and the slider aerodynamic bearing surface, relative to the actuator pivot.

Once such precise positioning is obtained, the overlying surfaces must be clamped to retain this precise positioning while the adhesive cures. Additionally, preparatory to this latter step, the adhesive must be selected such that the conditions required for its curing do not impose undue environmental effects on either the HGA or the actuator mechanism.

Accordingly, there is a need in attaching head gimbal assemblies to actuator arms for use in tightly packed rotary disk drives having high storage capacity, for a process technique that will, with minimal thickness, permit attachment of the head gimbal assembly to the actuator arm in a comb assembly, enabling its use in rotary disk drives of small disk-to-disk spacing.

SUMMARY OF THE INVENTION

The present invention provides a head gimbal assembly ("HGA") that is attached to an actuator arm utilizing an adhesive without mount plates. In accordance with the present invention, an area of the suspension is etched by a suitable etching means to form capillary grooves. During manufacture, the suspension is clamped in place to the arm, and the adhesive is applied to the entrance of the grooves. The adhesive is drawn into the grooves by capillary action, and the adhesive is then cured. The direct attachment of the HGA to the actuator arm permits elimination of the mount plates required for swaging, resulting in a thickness reduction of 0.4 mm. Additionally, since the HGA-to-arm point of attachment no longer is required to withstand the mechanical stresses imposed by swaging, the arm tip thickness can be further reduced by 0.1 or 0.2 mm. When combined with the thickness reduction resulting from the elimination of the mount plates, the adhesive HGA-arm attachment results in a thickness reduction that permits a disk-to-disk spacing in the range of 1.2 mm–1.44 mm, using materials and standard drives currently found in the industry.

In accordance with the present invention, the adhesive is applied only after the HGA-actuator arm connection has been properly aligned and assembled, i.e. the individual components are assembled dry. This permits the HGA to be aligned using suitable external datums, and when properly aligned, the assembly is clamped together to preclude the further movement thereof. The adhesive is applied to the HGA-arm interface by utilizing a network of channels formed in the surface of the HGA that mates with the actuator arm. By utilization of a low viscosity adhesive, such as a capillary epoxy or a cyanoacrylate adhesive, these channels distribute an effective amount of adhesive throughout the mating surface area of the HGA at which the HGA is mounted to the actuator arm.

In the case of the a multi-arm actuator comb, the individual head gimbal assemblies must be properly positioned on their respective actuator arms, spacers are then inserted between each such pair, with a clamp then installed to compress the entire stack of actuator arms, spacers, and HGAs to preclude any movement in these multiple connections until after application of the adhesive. Alternatively, wedge-shaped spacers can be used, with the insertion providing the necessary clamping force. Both of these alternatives are well known to the industry, and have been used to construct multi-arm actuator combs where attachment of the HGA's utilizes swage technology. After application of the adhesive, the clamping continues until the required cure time has elapsed. Since elevated temperatures act to reduce the cure time, heating of the arm-HGA connection may be desirable, perhaps utilizing resistive heaters placed within the clamping mechanism.

Additional features and advantages of the present invention are described in, and will be apparent from, the detailed description of the presently preferred embodiments and from the drawings.

BRIEF DESCRIPTION OF THE DRAWING

FIG. 9 is a partial plan view, with portions in phantom, schematically illustrating an actuator arm attached to an HGA, having an adhesive receiving cavity formed therein;

FIG. 10 is a partial plan view, with portions in phantom, similar to FIG. 9, showing an actuator arm attached to an HGA having an alternatively-designed adhesive receiving cavity formed therein;

FIG. 11 is a cross-sectional view taken along line 11–11 of FIG. 10;

FIG. 12 is a cross-sectional view showing a pair of adhesive cavities formed in adjoining head gimbal assemblies at their attachment location on an actuator arm in accordance with the present invention;

DETAILED DESCRIPTION OF THE PREFERRED EMBODIMENTS

Disk drives increasingly tend to utilize multiple heads that electromagnetically act with multiple recording disks mounted on a single, rotatable spindle. Head gimbal assemblies (hereinafter "HGA's") are provided to support and position the heads over desired radial positions on the magnetic disks. HGA's include several independent members that terminate at a point of attachment for a slider that carries a transducer head. As traditionally constructed, three separate members are attached together to support the slider in its radial movement over the magnetic medium in response to the controlled movements of an actuator motor, namely the load beam, mount plate and flexure. For multiple disk storage devices, a number of actuator arms are attached to the motor, with each arm attached to a separate HGA at the "support" or "mount" plate member thereof.

The support plate member is fabricated out of a rigid material, such as stainless steel, to provide a solid support surface to which the other HGA members are attached by swaging. As the disk drive industry moves towards multi-disk disk drives having closer and closer disk spacings, the thickness required by the mounting plate has limited the extent to which the inter-disk spacings can be reduced.

Figure 1:
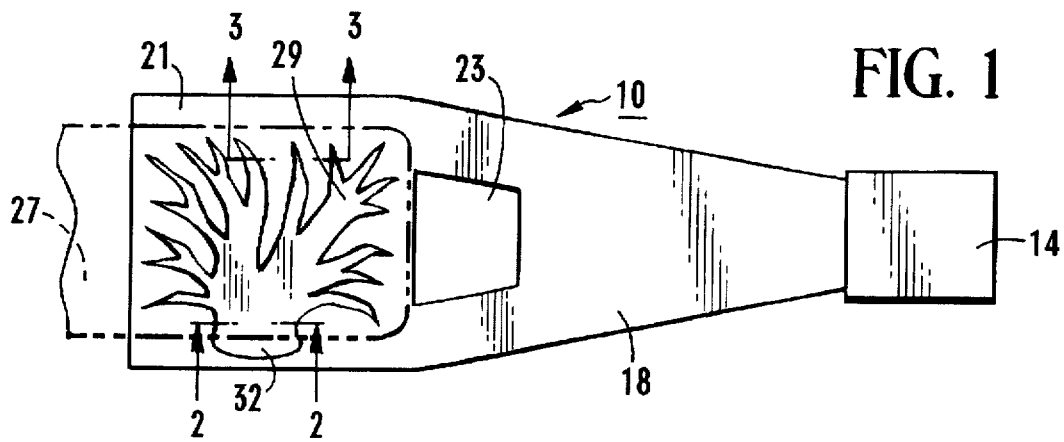
FIG. 1 is a top, plan view of a head gimbal assembly ("HGA") for a hard disk drive, with portions of an actuator arm shown in phantom, in accordance with the present invention.

Turning now to FIG. 1, a head suspension assembly 10 has three separately identifiable sections, including a slider 14 that carries a magnetic transducer (not shown), a flexure 18, and a mating surface area 21 at the base of the flexure. The flexure 18 is designed to enable limited movement of the slider 14 relative to the mating surface area 21, and thereby enhance the tracking ability of the slider 14 as it rides over a magnetic disk (not shown in FIG. 1). An intermediate opening 23 is formed in the flexure 18. The positioning and geometric shape of the intermediate opening 23 is determined according to the desired bending moment of the flexure 18.

The mating surface area 21 provides a platform upon which can be mounted an actuator arm 27 (shown in phantom). In order for the slider to accurately locate and obtain information stored on the magnetic medium, it is vital that the attachment between the actuator arm 27 and the HGA 10 be precisely positioned and rigidly maintained over the life of the component. To effectuate such an attachment utilizing an adhesive, a dendritic etch pattern is formed in the mating surface area 21 of the flexure 18 of the HGA 10. This tree-like pattern forms a network of channels in the surface of the mating surface area 21. After placement and positioning of the suspension on the actuator arm 27 at the mating surface area 21, these channels can then subsequently be filled with a suitable adhesive.

The dendritic etch pattern 29 is so formed in the mating surface area 21 as to enable access to the surface channel pattern through a source point 32 after the actuator arm 27 has been placed and properly positioned upon the flexure 18 at the mating surface area 21. The source point 32 enables admission of the adhesive material (not shown in FIG. 1) to the individual channels making up the dendritic etch pattern 29 after the majority of the etch pattern has been covered by the actuator arm. It is contemplated that the adhesive material will be introduced through the source point 32, after the actuator arm 27 has been properly positioned and clamped to the HGA 10, with the clamp being maintained until after the complete curing of the adhesive material.

Figures 2, 3:
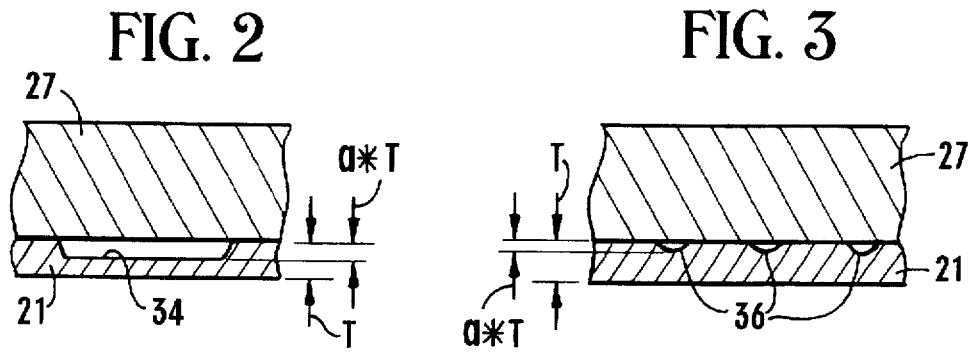
FIG. 2 is a cross-sectional view taken along line 2—2 of FIG. 1, showing a portion of the HGA-actuator arm interface.
FIG. 3 is a cross-sectional view taken along line 3—3 of FIG. 1, showing an HGA-actuator arm surface interface at an alternative location to that shown in FIG. 2.

The width as well as the depth of the grooves of the dendritic etch pattern 29 can be varied. Once a threshold etch width has been exceeded, it is believed that the narrower the etch width, the shallower the groove to obtain a satisfactory in flow of the adhesive. A wide channel 34 is depicted in FIG. 2, and represents a portion of the dendritic etch pattern 29 located relatively close to the source point 32. For such a situation, where the flexure 18 has a thickness "T" at the mating surface area 21, the depth of the wide channel 34 is preferably "a*T" where "a" =0.6. In contrast, a plurality of narrow channels 36 are shown in FIG. 3, and they represent portions of the dendritic etch pattern 29 located adjacent the channel ends or tips. Due to their narrower width, the narrow channel 36 requires less depth in order to obtain a flow of adhesive therethrough. In such instances, where the flexure 18 has a depth "T" at the mating surface area 21, the depth of the narrow channel 36 is a*T, where "a" is less than 0.5.

When a disk is rotated in a disk drive, a cushion of air is generated and lies adjacent the surface of the rotating disk. The slider 14 is provided with an aerodynamic surface that causes the slider to "float" or "fly" upon this cushion of air. One of the design requirements for the HGA attachment to the actuator arm relates to the ability to consistently control the actuator arm-HGA boundary. Control of this boundary, in turn, permits control over the gram loading and suspension dynamics. These parameters are carefully selected, and must exhibit a high degree of consistency, in order to support the flying and servodynamics functionalities.

The manner of securing the actuator arm to the HGA utilizing adhesives as taught under the present invention introduces certain inherent uncertainties with regard to the base boundary condition. The amount of adhesive in the actuator arm-HGA joint cannot be predicted with certainty, and will depend in large part upon the ease with which the particular adhesive can be wicked. More importantly, since the channels are blanketed by the overlying actuator arm in the final structure, it is not possible to inspect the resulting joint and determine the adhesive amount successfully wicked into the channels. Under such circumstances, the cantilevered boundary condition is destined to be somewhat variable.

Figure 4:
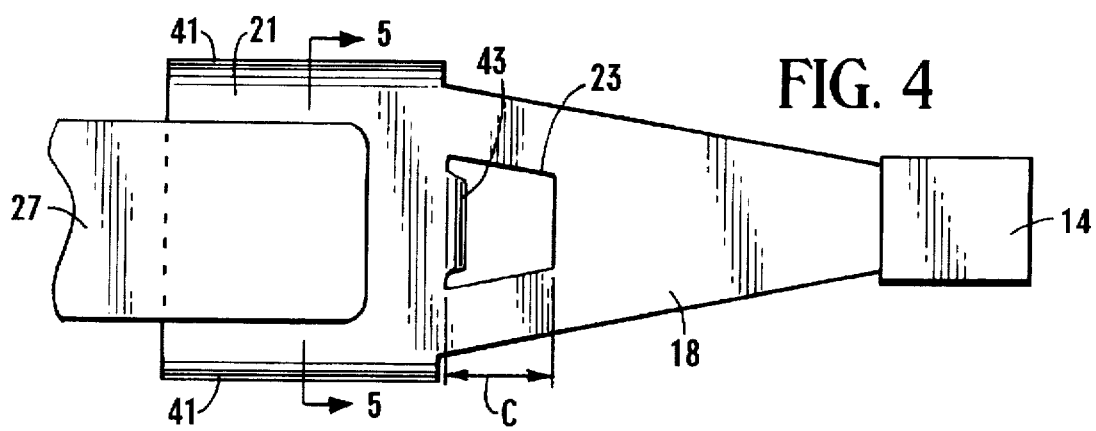
FIG. 4 is a top, plan view, with portions shown in phantom, of an alternative embodiment of a head gimbal assembly shown attached to an actuator arm in accordance with the present invention.

To lessen the importance of this variance in adhesive amount, the flexure 18 (shown in FIG. 4) is preferably provided with a pair of exposed external side stiffeners 41 that abut respective sides of the mating surface area 21. In addition, the intermediate opening 23 is provided with a lateral stiffening flange 43. As previously mentioned, the intermediate opening 23 formed in the flexure 18 is so configured as to control the amount of the biasing force applied by the HGA to oppose the aerodynamic force created by the flying slider 14. That portion of the flexure 18 lying adjacent the intermediate opening 23 is termed the load spring portion of the HGA, and in FIG. 4 such load spring has a length indicated by the referenced letter "c".

Figure 5:
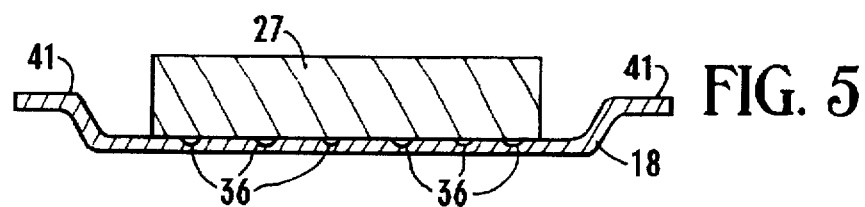
FIG. 5 is a cross-sectional view taken along line 5—5 of FIG. 4.
Figure 6:
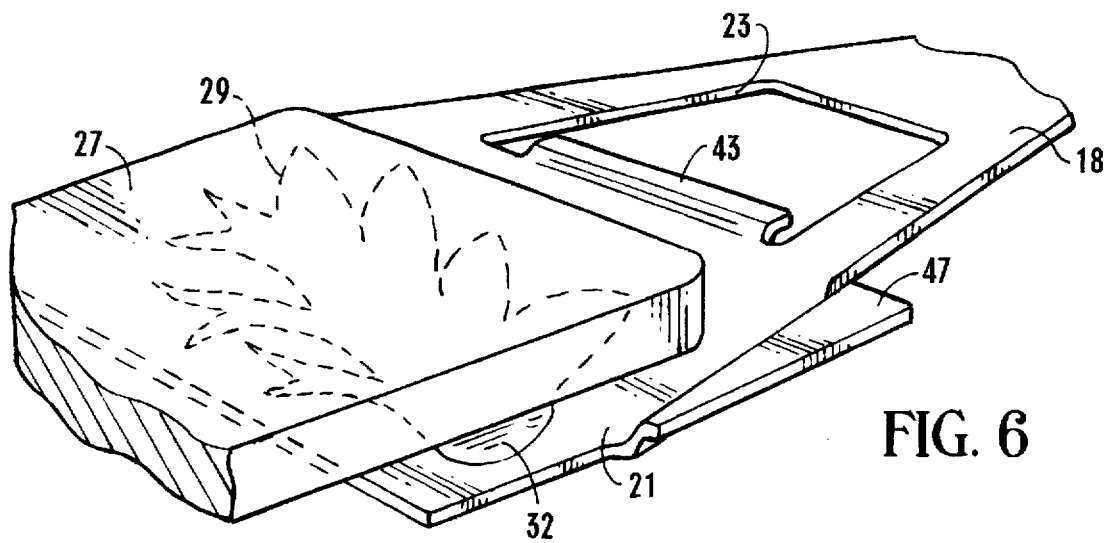
FIG. 6 is a partial perspective view, with portions shown in phantom, showing an alternative embodiment of an HGA attached to an actuator arm in accordance with the present invention.

By carrying a consistent stiffness to the suspension load spring, the side stiffeners 41, as shown in FIG. 5, address the inherent variability in the boundary condition at the point of attachment between the actuator arm 27 and the mating surface area 21. Unfortunately, when fabricating actuator combs that are to be used with multiple disks, the presence of the side stiffeners 41 will interfere with the placement of the adhesive in the mount plate channels, particularly when the second HGA is attached to the actuator arm. FIG. 6 illustrates a compromise solution to this dilemma, wherein a pair of shortened side stiffeners 47 extend from the load spring portion of the flexure 18 to just short of the source point 32, where the adhesive is introduced into the mount plate channels.

One embodiment of the present invention resulted from experimental flow observations with respect to a specific adhesive. In this regard, the inventors conducted an experiment in which half-etched grooves were simulated by stacking cut pieces of stainless steel between glass microscope slides to form grooves having various widths and thicknesses. BLACK MAX brand adhesive was then introduced to the groove entrances using a watch oiler. The rates and extent of penetration into the groove areas were observed using a stereo microscope.

While BLACK MAX brand adhesive was observed to be effectively wicked between the steel and glass gaps of range 0.076 and 0.03 mm, there appeared to be a width threshold requirement. For example, at the gap of point 0.076 mm, adhesive successfully wicked into a 0.23 mm-wide groove; however, at a 0.03 mm gap, there was no adhesive penetration into a 0.13 mm-wide groove. For groove widths of 0.25–0.7 mm, the penetration distance was observed at between 0.9–1.6 mm. For slightly wider grooves, having widths of 1–2.5 mm, the observed penetration distance was 0.6–2.8 mm. In all cases, penetration was observed to occur at a relatively slow velocity, taking perhaps 10–15 seconds to reach the maximum penetration distance. The loosely clamped steel-to-glass interface also created a separate type of penetration by the BLACK MAX brand adhesive. The small gap around the edges of the various grooves evidenced a penetration of the adhesive of 0.04–0.06 mm, up to a maximum penetration of 0.10–0.2 (even 0.3) mm.

The experimentation with the BLACK MAX brand adhesive also included investigation with respect to radius or half circle grooves. At least upon this preliminary investigation, grooves of such a shape seemed particularly advantageous, with the BLACK MAX brand adhesive wicking quickly into the entrance gap. These grooves were so shaped that the width of the groove decreased as the adhesive penetrated inwardly, coinciding with the decrease in adhesive speed with increasing distance of the adhesive from the application point.

Figure 7:
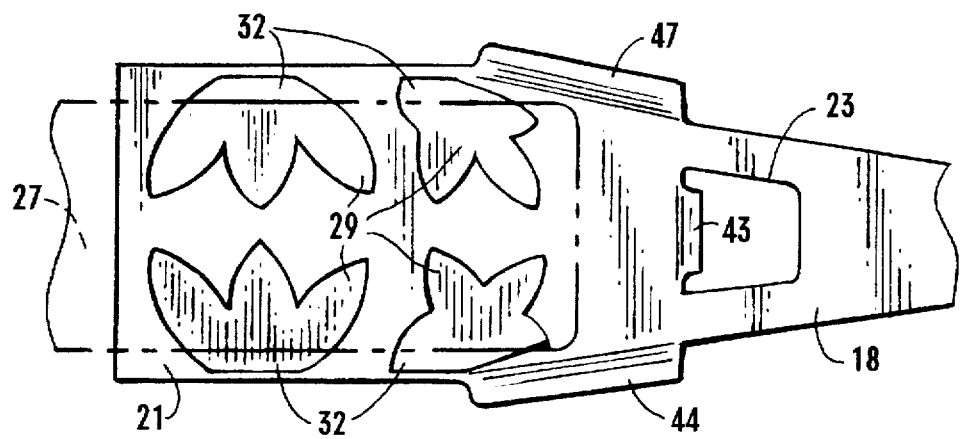
FIG. 7 is a top, plan view, with portions shown in phantom, of a further alternative embodiment of and HGA attached to an actuator arm in accordance with the present invention.

As a result of these observations, the embodiment illustrated in FIG. 7, particularly the more blunt dendritic etch patterns 29, was developed to take advantage of the observed penetration properties of the BLACK MAX brand adhesive. Since the inward extent of penetration is somewhat limited, both lateral sides of the actuator arm tip 27 will require adhesive application. Additionally, the dendritic etch pattern 29 has been modified to a more blunt design, having groves of a half-circle shape, and eliminating the thin branches. Each of these dendritic etch patterns are provided with a separate source point 32 at which location the adhesive is introduced into the grooves.

An examination as to the relationship between the extent of adhesive penetration and the shape of the etched channel suggests possible other etch patterns. Adhesive penetration between two surfaces can occur either through the natural, wicking process, by virtue of capillarity, or by means of pressure, forcing its penetration. In some respects this is comparable to the differences between the processes of natural and forced air convection.

When penetration is due to the capillary interaction between the adhesive and the edge channel shape, the penetration length is proportional to:

$$\Gamma \frac{L}{A} \frac{1}{v}$$

where A is the cross-sectional area of the etched channel to which the adhesive will propagate, L is the length of the perimeter of A, v is the viscosity of the adhesive, and T is a term that is dependent upon three factors: (a) surface tension of the adhesive; (b) the cohesion of the molecules of the adhesive; and (c) the adhesion of the channel surfaces. Where adhesion is greater than cohesion, the channel is wet by the adhesive and the adhesive penetrates the channel. This relationship also indicates that where cross sections are long in one dimension and short with respect to the other (e.g., a very narrow rectangle), the term L/A will be maximized.

Figure 8:
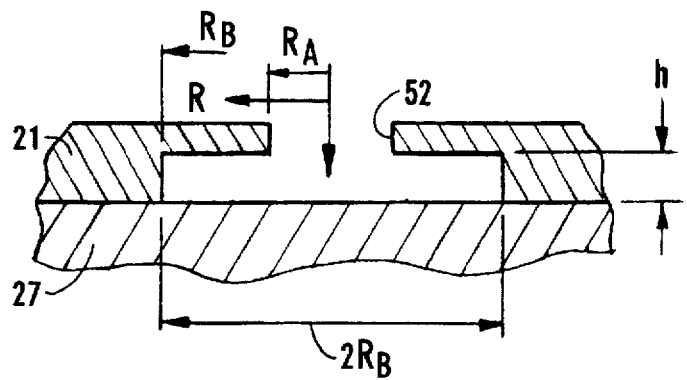
FIG. 8 is a partial cross-sectional view showing an interface between an actuator arm and a head gimbal assembly in which an adhesive receiving cavity has been formed in accordance with the present invention.

The channel shown in cross section in FIG. 8 illustrates the type of channel shape that will effectively wick the adhesive. As R increases from $R_A$ to $R_B$, the ratio L/A is constant:

$$\frac{L}{A} = \frac{4\pi R}{2\pi R h} = \frac{2}{h}$$

In comparison, consider, for a rectangle having length B and width A, the ratio becomes:

$$\frac{L}{A} = \frac{1}{h}$$

Returning once again to FIG. 8, an adhesive application opening 52 is formed in the mating surface area 21. Where it is desired to apply the adhesive under pressure, the opening 52 having a radius $R_A$ can be selected to correspond to the injector used to dispense the adhesive. Alternatively, when no pressure is available, radius $R_A$ is preferably made large in order to accept a larger amount of the adhesive, which will expand to fill the enlarged lower cavity having radius $R_B$.

Based upon such mathematical theory, the embodiment shown in FIG. 9 provides a pair of injector openings 56 in the mating surface area 21 of the head gimbal assembly 10. The injector openings 56 provide adhesive access through a pair of rectangular cavities 58 that have been etched into the surface of the flexure 18 at the mating surface area 21 that will receive the actuator arm 27 (shown in phantom). After the head gimbal assembly 10 has been properly positioned upon the actuator arm 27, an appropriate amount of an adhesive (not shown) is introduced into the pair of rectangular cavities 58, under pressure, through the injector openings 56.

In those instances where the adhesive is not pressurized, an embodiment such as that shown in FIG. 10 may be appropriate. An adhesive deposit opening 61 is formed in the mating surface area 21 and provides access to a semi-circular cavity 63 that has been etched into the surface of the mating surface area 21. Upon proper alignment of the actuator arm 27 (shown in phantom) and the mating surface area 21 of the head gimbal assembly 10, the enlarged diameter of the adhesive deposit opening 61 enables a greater deposit of an adhesive (not shown), which in turn fills the semi-circular cavity through capillary action.

A pair of head gimbal assemblies are typically attached to a single actuator arm. In FIG. 11, the pair of mating surface areas 21a, 21b is attached to the actuator arm 27 utilizing an adhesive (not shown) deposited within a pair of semicircular cavities 63a, 63b through their respective enlarged adhesive deposit opening 61a, 61b.

In an alternative embodiment disclosed in FIG. 12, an opposed pair of modified mating surface areas 67a, 67b is shown attached to a modified actuator arm 69 having a pair of throughbores 72 formed therein. Once properly positioned, an appropriate amount of adhesive (not shown) is introduced through the throughbore 72 into a respective pair of radial cavities 76. The utilization of the throughbore 72 permits a larger amount of adhesive to be initially dispensed, with propagation thereafter resulting through capillary action.

Figure 13:
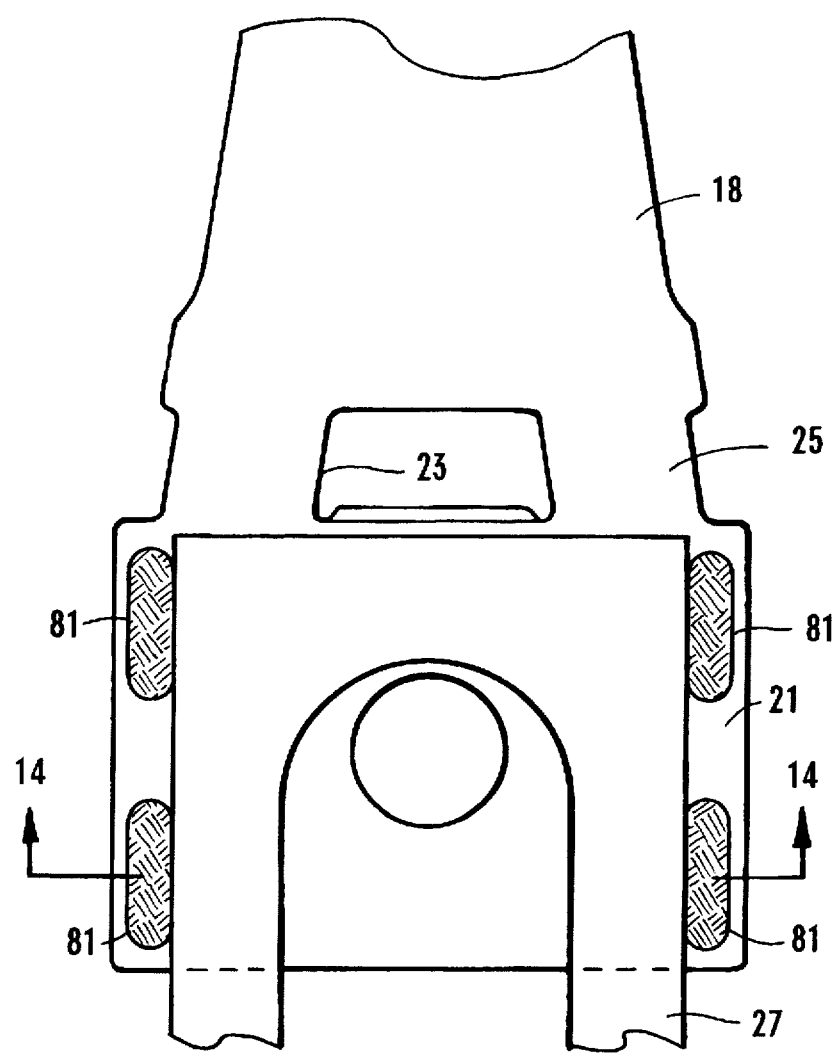
FIG. 13 is a partial plan view, with portions in phantom, schematically illustrating an alternative manner of attachment of an actuator arm to a head gimbal assembly utilizing adhesive grooves in accordance with the present invention.
Figure 14:
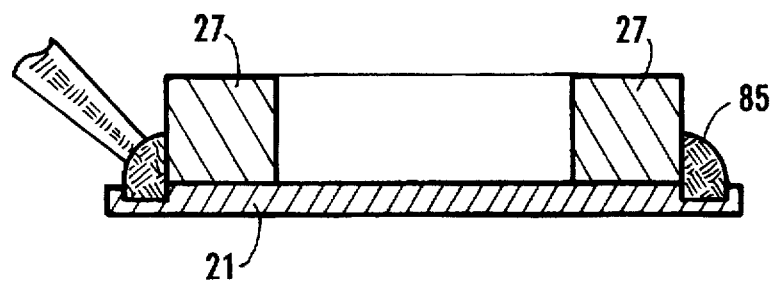
FIG. 14 is a cross-sectional view taken along line 14—14 of FIG. 13.

For non-capillary adhesives, the embodiment illustrated in FIGS. 13 and 14 includes a plurality of adhesive grooves 81 formed in the mating surface area 21. The adhesive grooves 81 are formed at locations about the periphery of the actuator arm 27 when the actuator arm 27 is received and properly positioned on the mating surface area 21. When so positioned, a fillet of adhesive 85 is placed within each adhesive groove 81. The fillet of adhesive 85 is anchored within the adhesive grooves 81 and attaches to a lateral edge of the actuator arm 27. The fillet of adhesive 85 thereby secures the actuator arm 27 to the mating surface area 21. In this case, the adhesive grooves 81 are providing only increased adhesion, rather than a controlled thickness.

Figure 15:
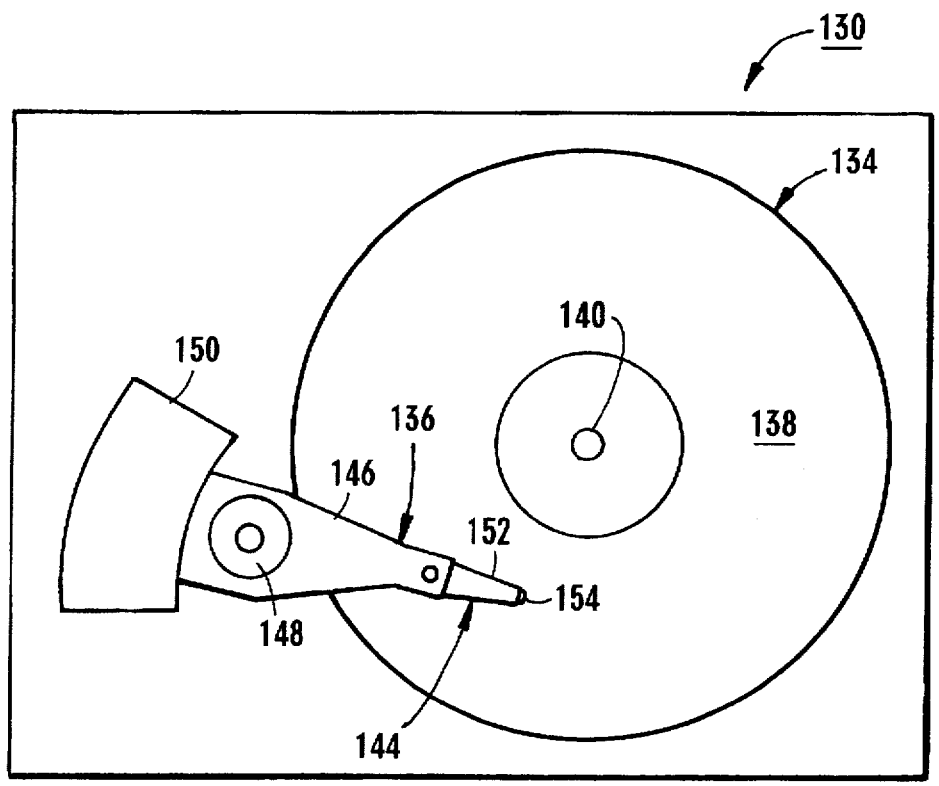
FIGS. 15, 16, and 17 illustrate a magnetic disk drive that includes a head gimbal assembly attached to an actuator arm in accordance with the present invention.
Figure 16:
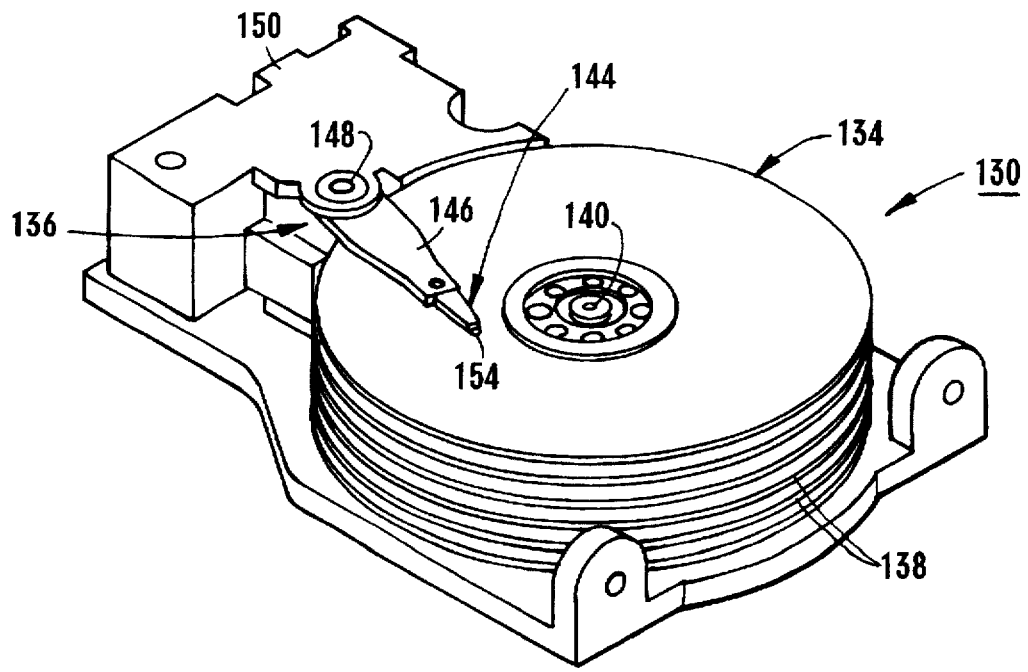
Figure 17:
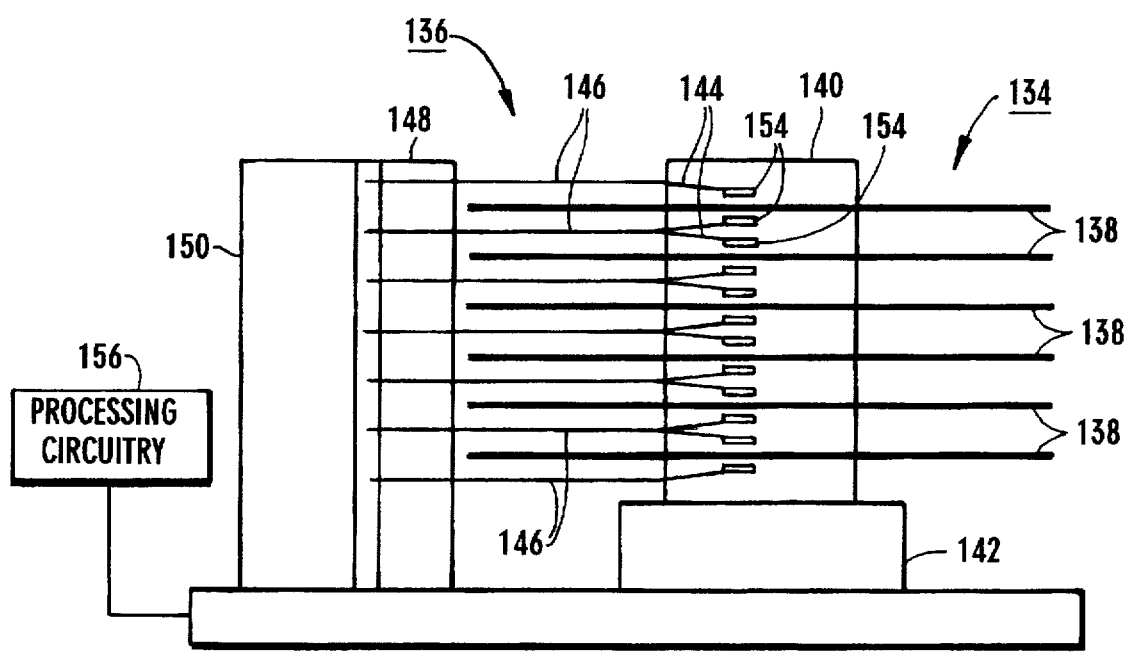

Referring now to FIGS. 15, 16, and 17, a disk drive 130 is illustrated, and employs a disk stack assembly 134 and a head stack assembly 136. The disk stack assembly 134 includes a plurality of vertically stacked disks 138 that are supported for rotation on a spindle 140, which in turn is rotated by a motor 142. The head stack assembly 136 includes a plurality of vertically-stacked head gimbal assemblies 144, each assembly being mounted to a respective actuator arm 146 in a manner that embodies the present invention. Each of the actuator arms 146 is mounted for rotation on an actuator hub 148 which is rotated by a voice coil 150. Each head gimbal assembly 144 includes a load beam 152, which has mounted thereon a slider 154 that carries a magnetic head (not shown) for reading and writing magnetic signals on the disk 138.

Processing circuitry 156 (See FIG. 17) is operatively connected to the spindle motor 142, the voice coil 150, and the magnetic heads (not shown) in order to rotate the disks 138, and displace the actuator arms 146, and to read and write on the disks, respectively. When the voice coil 150 is operated, the magnetic heads on the slider 154 are moved to selected circular tracks (not shown) on the disks 138 where information is magnetically read and magnetically written by the heads. Because of direct access to the circular tracks by simple rotation of the actuator arm 146, this type of storage device is known as a direct access storage device (DASD).

Each of the load beams 152 pre-loads the respective slider 154 on the surface of the disk 138. When the disks 138 are rotated, each disk creates a cushion of air (an "air bearing") that counterbalances the pre-loading applied by the load beam 152. This counterbalancing causes the slider 154 to fly slightly off of the surface of the disk 138—on the order of 0.075 microns. The surface of the slider 154 that is supported by this air bearing is known as an air bearing surface (ABS). In some applications, the surface of the disk 138 may be provided with a lubricant (not shown) allowing the ABS of the slider 154 to slightly contact the surface of the disk 138 when it is rotated. The head suspension assembly 144 is constructed to permit slight vertical movements as well as pitch and roll of the slider 154 during rotation of the magnetic disk 138.

One of the advantages of the present actuator arm of an HGA assembly process is that its manufacturing flow is similar to the presently used swage assembly process flow. With respect to the presently used manufacturing process, an actuator comb/cable assembly is fixtured in a tool. Suspensions are placed one by one into the comb assembly and are held against the arm tips with retaining fingers until all "bottom" head gimbal assemblies are in place. The swage spuds are inserted in each arm as they are placed into the comb assembly to align the suspensions. Tightly fitting spacers are inserted between the mount plates of the suspensions. The swage ball is then driven through each mount plate to expand the swage spuds into the arm holes. The wiring is terminated to the actuator cable, and then the process is repeated to accomplish the attachment of all of the "top" head gimbal assemblies.

In a like manner, the assembly process utilizing the attachment procedure of the present invention begins by placing the actuator comb/cable assembly in a tool. The suspensions are again placed one-by-one into the comb assembly, and are held against the arm tips with retaining fingers until all "bottom" head gimbal assemblies are in place. Alignment pins are inserted in stages through each load beam as they are placed into the comb assembly to properly align the suspensions. Tightly fitting spacers are then inserted between the bases of the suspensions, and an adhesive is dispensed along each side of the suspension base and allowed to wick into the half etch grooves. The adhesive is then to cured for a sufficient time, followed by removal of the spacers, alignment pins, as well as removal of the actuator from the tool. Wiring is then terminated to the actuator cable, and this process is repeated to accomplish the insertion and attachment of all the "top" head gimbal assemblies.

The actuator rework process flow would likely be more difficult than with the current swage rework. Utilizing the capillary adhesive bonding technique of the present invention, work would first consist of peeling the suspension away from the arm, a process that is not likely to present any serious difficulties. A more difficult process step would then be in cleaning the adhesive from the arm. It is presently conceived that a controlled scraper would be used to, in a single stroke, scrape off the high points of the adhesive and a vacuum would then be used to remove the powder generated by this scraping. Prior to reassembly, the actuator would have to be cleaned, and assembly would be along the identical steps as the initial assembly process described above.

It should be understood that various changes and modifications to the presently preferred embodiments that are described herein will be apparent to those skilled in the art. Such changes and modifications can be made without departing from the spirit and scope of the present invention, and without diminishing its attendant advantages. It is, therefore, intended that such changes and modifications be covered in the appended claims.

We claim:

1. A suspension assembly for supporting a transducer in a disk drive, comprising:

a suspension member; and, a base on said suspension member, a portion of said base including a mating surface area in which is formed a network of channels, said network of channels defining an etch pattern.

2. A suspension assembly as described in claim 1, wherein said etch pattern comprises a dendritic etch pattern.

3. A suspension assembly as described in claim 2, wherein said etch pattern comprises a blunt dendritic etch pattern.

4. A suspension assembly as described in claim 1, wherein said etch pattern comprises a cavity.

5. A suspension assembly as described in claim 4, wherein a pair of cavities are provided.

6. A suspension assembly as described in claim 4, wherein said mating surface area includes an injector opening formed therein, said injector opening in fluid communication with said cavity.

7. A suspension assembly as described in claim 4, wherein an adhesive deposit opening is formed in said mating surface area, said adhesive deposit opening in fluid communication with said cavity.

8. A suspension assembly as described in claim 1, wherein a pair of suspension members are provided, each having a respective base and a mating surface area therein, said mating surface areas of said pair of suspension members including a throughbore, and said etch pattern in each comprising a cavity, said respective throughbores and cavities so located on said respective mating surface areas such that when said pair of suspension members are superposed, said throughbores overlie said cavities.

9. A suspension assembly as described in claim 1, wherein said etch pattern comprises a plurality of adhesive grooves located about a periphery of said mating surface area.

10. An actuator assembly for disk drives, comprising:
   an actuator arm; and
   a head gimbal assembly having a base with an etch pattern defined thereon, said base receiving a surface of said actuator arm.

11. An actuator assembly as defined in claim 10, and further comprising:
   an adhesive received within said etch pattern for bonding said base to said surface of said actuator arm.

12. An actuator assembly as defined in claim 11, wherein said etch pattern includes a source point, and said etch pattern comprises a plurality of channels, with access to said channels provided through at least one source point.

13. An actuator assembly as defined in claim 12, wherein said etch pattern is configured to enhance the penetration of an adhesive material from said source point into said channels of said etch pattern.

14. An actuator assembly as defined in claim 13, wherein said activation arm abuts a mating surface area of said base when received thereby, with said etch pattern configured such that said source point is located outside of said mating surface area, whereby access to said plurality of channels is provided subsequent to reception of said actuator arm by said mating surface area.

15. An actuator assembly as defined in claim 13, wherein said etch pattern is a dendritic etch pattern.

16. An actuator assembly as defined in claim 15, wherein said etch pattern is a blunt dendritic etch pattern.

17. An actuator assembly as defined in claim 13, wherein said etch pattern is a cavity.

18. An actuator assembly as defined in claim 17, wherein said etch pattern is a radial cavity.

19. An actuator assembly as defined in claim 11, wherein said etch pattern comprises a plurality of adhesive grooves located about a periphery of said mating surface area.

20. An actuator assembly as defined in claim 19, further including a fillet of adhesive within each of said adhesive grooves, said fillet of adhesive attaching to a lateral edge of said actuator arm and securing same to said base.

21. An actuator assembly as defined in claim 10, and further comprising:
   a second head gimbal assembly having a base with an etch pattern defined thereon, wherein said actuator arm has an etch pattern comprising a set of throughbores defined thereon, and said etch pattern of both said first and said second head gimbal assemblies comprises a throughbore and a cavity,
said etch patterns of said respective head gimbal assemblies and said actuator arm configured such that when said first and second head gimbal assemblies are positioned and aligned on said actuator arm, on opposing sides thereof, said etch patterns of said head gimbal assemblies cooperate with said throughbores of said actuator arm such that said throughbores of said first and second head gimbal assemblies are in fluid communication with said cavities of the respective, opposing head gimbal assembly, through said throughbores of said actuator arm.

22. A method of attaching a head gimbal assembly member to an actuator arm, comprising the steps of:

placing a head suspension assembly onto a mounting surface an actuator arm in a manner such that a base of said head gimbal assembly, having an etch pattern formed thereon, mates with said mounting surface of said actuator arm;

aligning said head gimbal assembly on said actuator arm, wherein a head on said head gimbal assembly is properly positioned relative to said actuator arm;

clamping said head gimbal assembly to said actuator arm upon achieving the proper alignment thereof;

dispensing an adhesive into one or more source points formed in a surface of said head gimbal assembly, said source point in fluid communication with said etch pattern of said base;

providing a path through which an effective amount of said adhesive wicks into said etch pattern; and curing said dispensed adhesive to form an adhesive connection.

23. A method of attaching a plurality of head gimbal assemblies to an actuator comb, said actuator comb comprising a plurality of actuator arms attached to one another at respective base portions thereof, comprising the steps of:

forming an etch pattern in a head gimbal assembly, said etch pattern including a source point in fluid communication with said etch pattern;

placing said etch pattern against an arm tip of one of said actuator arms;

repeating the forming and placing steps until a head gimbal assembly has been placed on each of said plurality of activator arms of said actuator comb/cable assembly;

aligning said head gimbal assembly on said actuator arm;

clamping said head gimbal assembly to said actuator arm after the alignment thereof;

dispensing an adhesive into said source point after the alignment and clamping of said head gimbal assembly to said actuator arm, said adhesive wicking into said etch pattern through said source point; and curing said adhesive to form an adhesive connection between said actuator arm and said head gimbal assembly.

24. A process as recited in claim 23, and further comprising the steps of:

inverting said actuator comb/cable assembly having a first set of adhesive connections formed between each of said plurality of actuator arms of said actuator comb/cable assembly and a head gimbal assembly; and repeating the steps of claim 23 until a second set of adhesive connections are formed between each of said plurality of actuator arms of said actuator comb/cable assembly and a head gimbal assembly.

25. A method of attaching a plurality of head gimbal assemblies to an actuator comb, said actuator comb comprising a plurality of actuator arms attached to one another at respective base portions thereof comprising the steps of:

forming an etch pattern in a head gimbal assembly, thereby defining a mating surface area, said etch pattern comprising a plurality of adhesive grooves located about the periphery of said mating surface area;

placing said mating surface area against an arm tip of one of said actuator arms of said actuator comb;

repeating the forming and placing steps until a mating surface of a head gimbal assembly has been placed on and aligned with each of said plurality of activator arms of said actuator comb/cable assembly;

aligning said head gimbal assembly on said actuator arm;

clamping said head gimbal assembly to said actuator arm;

forming a fillet of an adhesive in each of said adhesive grooves, anchoring said adhesive in said grooves and attaching each of said head gimbal assemblies to a respective one of said actuator arms; and curing said dispensed adhesive to form an adhesive connection between said actuator arm and said head gimbal assembly.

26. A process as recited in claim 25, and further comprising the steps of:

inverting said actuator comb/cable assembly having a first set of adhesive connections formed between each of said plurality of actuator arms of said actuator comb/cable assembly and an head gimbal assembly; and repeating the steps of claim 25 until a second set of adhesive connections are formed between each of said plurality of actuator arms of said actuator comb/cable assembly.

27. A magnetic disk drive, comprising:

a disk stack assembly, wherein a plurality of vertically-stacked disks are supported for rotation on a motorized spindle;

a head stack assembly, wherein a plurality of vertically-stacked head gimbal assemblies are respectively attached to a plurality of actuator arms forming a plurality of adhesive connections, each such adhesive connection comprising:

an etch pattern on said head gimbal assembly defining a mating surface area;

an adhesive received within said etch pattern; and a surface of said actuator arm received by and bonded to said mounting surface area by the adhesive-filled etch pattern;

an actuator hub rotatably supporting each of said actuator arms;

a voice coil mechanically connected to said actuator arm; and processing circuitry connected to said motorized spindle, said voice coil, and a plurality of magnetic heads, each of said magnetic heads being supported by one of said plurality of head gimbal assemblies.

28. A magnetic disk drive as described in claim 27, wherein said etch pattern comprises a plurality of adhesive grooves located about a periphery of said mating surface.

29. A magnetic disk drive as described in claim 27, further including an adhesive deposit opening formed in the head gimbal assembly at a location that is at least partly outside of said mating surface area, said adhesive deposit opening in fluid communication with said etch pattern.

30. A magnetic disk drive as described in claim 29, wherein said etch pattern comprises a dendritic etch pattern.

31. A magnetic disk drive as described in claim 30, wherein said etch pattern comprises a blunt dendritic etch pattern.

32. A magnetic disk drive as described in claim 29, wherein said etch pattern comprises a cavity.

33. A magnetic disk drive as described in claim 32, wherein said etch pattern comprises a pair of cavities.

34. A magnetic disk drive as described in claim 27, wherein a pair of said head gimbal assemblies is attached to said actuator arms, each of said pair of head gimbal assemblies having a respective mating surface area, said mating surface areas including a throughbore and said etch pattern in each comprising a cavity, said respective throughbores and cavities so located such that when said head gimbal assemblies are superposed, said throughbores overlie said cavities.

* * * * *